W. G. COLLINS.
MANUFACTURE OF IRON BARS FOR SEAT-HOOKS.

No. 184,591. Patented Nov. 21, 1876.

Witnesses:
P. C. Dieterich
Wm. Tupperman

Inventor:
Wm. G. Collins
Per: C. H. Watson & Co. Attorneys

UNITED STATES PATENT OFFICE.

WILLIAM G. COLLINS, OF NILES, OHIO.

IMPROVEMENT IN THE MANUFACTURE OF IRON BARS FOR SEAT-HOOKS.

Specification forming part of Letters Patent No. 184,591, dated November 21, 1876; application filed May 23, 1876.

*To all whom it may concern:*

Be it known that I, WILLIAM G. COLLINS, of Niles, in the county of Trumbull and State of Ohio, have invented certain new and useful Improvements in Seat-Hooks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to seat-hooks for wagons; and it consists in iron with alternate flat and rounded sides—that is, flat on one side and rounded on the other—as will be hereinafter more fully set forth.

Figure 1:
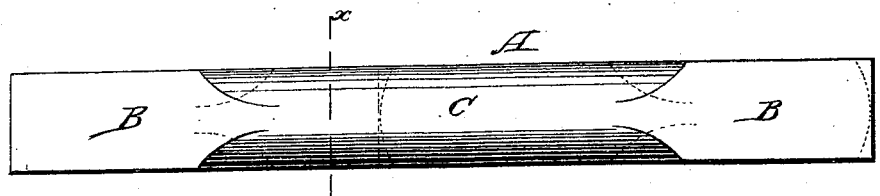
Figure 2:
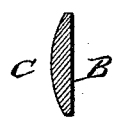
Figure 3:
Figure 4:
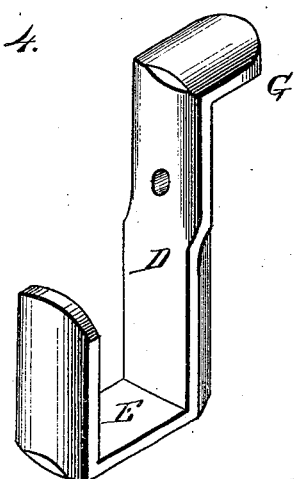
Figure 5:
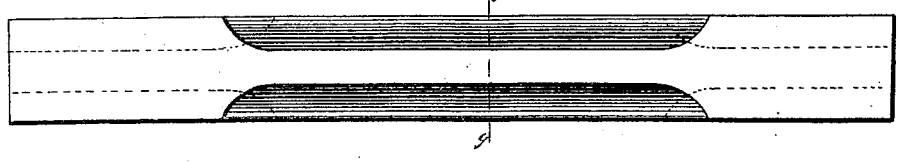
Figure 6:

In the annexed drawing, Figure 1 is a side view of a part of the bar thus rolled. Fig. 2 is a cross-section of the same. Fig. 3 shows the blank cut to form the hook. Fig. 4 is a perspective view of the hook in reversed position. Figs. 5 and 6 show a modification in the form of the blank.

Ordinary bar-iron (preferably of round form) is heated in the usual manner, and then passed between rolls, of suitable form and size, to form the rolled bar A, with each side having alternate flat surfaces B and rounded or convex surfaces C, which should be of the proper length, so that when the bar is cut up into blanks the desired sized hook may be formed therefrom.

After the bar has been rolled out, as described, it is cut into blanks, and each blank placed in suitable dies and formers, to bend it into the shape shown in Fig. 4. When thus bent, it will be seen that there is a vertical arm, D, with a hook, E, at its upper end, and an outward projection, G, at the lower end. The upper portion of the arm D as well as the entire hook E have the inner sides flat and the outer sides rounded or convex, so as to form a perfectly flat bearing where the hook rests upon and touches the side of the wagon-bed. The form of the lower portion of the arm D is reversed, the outer side being flat and the side next to the wagon-box convex; and the projection G is flat on top and convex on the bottom, thus forming a flat bearing where the seat is to rest and come in contact. This form of the iron makes the hook strong and durable, while the amount of the metal is materially reduced by having the edges thin, as shown. This object may be also attained by the form shown in Figs. 5 and 6, where the center of the blank is made thick, and then one side made thinner toward both edges—in fact, any form where it is comparatively thick along the middle and thin toward or at the edges.

Having thus fully described my invention, what I claim as new, and desire to secure by Letters Patent, is—

As a new article of manufacture, iron rolled to constitute bars with alternate flat and convex surfaces on opposite sides for seat-hooks, of the form herein described.

In testimony that I claim the foregoing as my own I affix my signature in presence of two witnesses.

WILLIAM G. COLLINS.

Witnesses:
C. H. WATSON,
WM. B. UPPERMAN.